United States Patent [19]

Breit

[11] Patent Number: 5,081,443
[45] Date of Patent: Jan. 14, 1992

[54] DEVICE FOR PROTECTING THE SYSTEMS AND LOAD OF MOTOR VEHICLES

[76] Inventor: Christoph Breit, Höcherbergstrasse 147, D-6652 Bexbach/Saar, Fed. Rep. of Germany

[21] Appl. No.: 449,969
[22] PCT Filed: Jun. 2, 1988
[86] PCT No.: PCT/DE88/00324
§ 371 Date: Jan. 29, 1990
§ 102(e) Date: Jan. 29, 1990
[87] PCT Pub. No.: WO88/09976
PCT Pub. Date: Dec. 15, 1988

[30] Foreign Application Priority Data

Jun. 2, 1987 [DE] Fed. Rep. of Germany ....... 3718471

[51] Int. Cl.$^5$ .............................................. B60R 25/10
[52] U.S. Cl. ..................... 340/426; 340/438; 340/459
[58] Field of Search .............. 340/425.5, 426, 438, 340/439, 441, 442, 459; 73/146.5

[56] References Cited

U.S. PATENT DOCUMENTS

| 4,088,980 | 5/1978 | Tanigawa et al. |
|---|---|---|
| 4,136,329 | 1/1979 | Trobert .............................. 340/459 |
| 4,376,227 | 3/1983 | Hilborn . |
| 4,510,484 | 4/1985 | Snyder ................................ 340/438 |
| 4,695,823 | 9/1987 | Vernon ............................... 340/449 |
| 4,845,649 | 7/1989 | Eckardt et al. ..................... 340/442 |

FOREIGN PATENT DOCUMENTS

| 0005436 | 11/1981 | European Pat. Off. |
|---|---|---|
| 0072000 | 2/1983 | European Pat. Off. |
| 0231155 | 1/1987 | European Pat. Off. |
| 2336522 | 2/1975 | Fed. Rep. of Germany . |
| 2535143 | 4/1976 | Fed. Rep. of Germany . |
| 2610621 | 9/1977 | Fed. Rep. of Germany . |
| 3034148 | 4/1981 | Fed. Rep. of Germany . |
| 3115149 | 11/1982 | Fed. Rep. of Germany . |
| 3208315 | 9/1983 | Fed. Rep. of Germany . |
| 3516802 | 11/1985 | Fed. Rep. of Germany . |
| 3510321 | 10/1986 | Fed. Rep. of Germany . |
| 3540599 | 5/1987 | Fed. Rep. of Germany . |

OTHER PUBLICATIONS $\mu$P and $\mu$C-based control systems cut engine pollution, up mileage, Electronic Design, vol. 26, Jul. 1978.
Hans D. Fournell and Rudiger Muller, "Bordcomputer fur Kraftfahrzeuege", Elektronik vol. 16, pp. 31-36 (1979).
"Automobilelektronik: Fluch Oder Segen?", Krafthand, vol. 3, pp. 82-86 (Feb. 1, 1986).

Primary Examiner—Jin F. Ng
Assistant Examiner—Brent A. Swarthout
Attorney, Agent, or Firm—Peter K. Kontler

[57] ABSTRACT

A device for monitoring the systems of a truck has sensors for detecting the gas tank level, temperature of the driver's compartment, outside temperature, operating conditions of the engine and electrical system, and various parameters of the fluids and exhaust gas. Electrical conductors connect these sensors to a control unit which receives signals from the sensors. The device includes at least one additional sensor which is located in a wheel of the truck. This additional sensor comprises a hollow spherical jacket, and the outer surface of the jacket is provided with a foil designed to measure tire temperature and pressure. The inner surface of the jacket is coated with an electrically conductive layer and magnetic strips are embedded in the jacket near the inner surface of the same. An inner sphere of synthetic resin having a plurality of coils embedded therein rides on the inner surface of the jacket via ball bearings. The inner sphere includes a signal receiver, electronic processing unit and radio transmitter. The radio transmitter sends the control unit data on tire temperature and pressure as well as data on movement of the inner sphere. The tire temperature is used to monitor brake function while the tire pressure is used to monitor the weight of the cargo. Movement of the inner sphere is used to detect attampted theft of the truck. Depending upon the signals recieved by the control unit, the control unit can inhibit starting of the truck, shut off the engine, generate an alarm and generate indications of malfunctions.

21 Claims, 21 Drawing Sheets

DEVICE FOR PROTECTING THE SYSTEMS AND LOAD OF MOTOR VEHICLES

BACKGROUND OF THE INVENTION

The invention relates to a device for protecting the systems and the cargo of motor vehicles with automatic monitoring of operating conditions. Information supplied by sensors is electronically processed and used to influence a consequence control unit. The sensors are in the form of spheres which are freely movable in the tires of the motor vehicle and are provided with radio interfaces for reporting the measured values to the motor vehicle or to a central control station.

Functional disturbances in the operation of the engine, brakes and other systems of motor vehicles must be quickly recognized and eliminated. If this does not occur, expensive repairs become necessary or systems become unusable and must be replaced, especially for motor vehicles with relatively large systems.

There have been various proposals for recording or indicating functional disturbances in motor vehicles and various warning devices have been proposed (West German Offenlegungsschrift No. 35 10 321, West German Offenlegungsschrift No. 35 16 802 and European Patent Application No. 0 005 436). While all known devices make it possible to detect faulty conditions in a motor vehicle, they leave it to the driver to take the appropriate steps for elimination of a faulty condition. In many cases, this is not done and eventually causes the engine, brakes, cooling system, etc., to be ruined.

A method and an apparatus for radio measurement of the pressure in a tire is known from the West German Offenlegungsschrift No. 2 610 621. Sensors in the form of spheres are freely movable in the tires of the motor vehicle and are provided with radio interfaces to report the measured values to the motor vehicle or a central control station. Only one measured value (tire pressure) can be obtained and the expense for this is relatively great.

A further problem is the protection and monitoring of the cargo of motor vehicles, particularly trucks. The primary concerns are protection against theft and cargo monitoring with the latter being a consideration especially in transport vehicles for chemicals, series of tanks, etc., where traffic safety is of particular importance.

SUMMARY OF THE INVENTION

It is an object of the invention to effectively monitor and protect essential systems, as well as the cargo, of motor vehicles by determining, in combination, tire pressure, temperature in the tires and movement.

According to the invention, this object is achieved in that the spherical sensors have an outer jacket in which an inner sphere is rotatably mounted via rollers. A pressure-temperature measuring foil is applied to the outer surface of the outer jacket and the inner side of the outer jacket is provided with an electrically conductive layer which is in contact with the pressure-temperature measuring foil. The inner sphere has a counterweight, and a signal processing component with associated coils, as well as associated magnetic bodies which are distributed over the periphery of the outer jacket, is provided for radio transmission of measured values of tire pressure, temperature and self-movement.

In accordance with one embodiment of the invention, the measured values transmitted by radio are used to activate a records control unit, a breaker control unit for starting and emergency cutoff, an indicator control unit and an alarm system control unit.

Another embodiment of the invention resides in that the weight of the cargo in the motor vehicle can be indirectly checked and a consequence control unit indirectly regulated by means of the tire pressure.

The invention has the additional feature that the function of the brakes can be indirectly checked and a consequence control unit indirectly influenced by means of the tire temperature.

Also in accordance with the invention, a security system against vehicle theft can be regulated via movement of the spherical sensor.

The advantages achieved with the invention are particularly a substantial reduction in operating costs through consequential, regulated system protection, an increase in traffic safety through continuous cargo monitoring, theft protection for the motor vehicle, especially the cargo, and continuous monitoring of tire pressure and movement.

BRIEF DESCRIPTION OF THE DRAWINGS

The invention is described in more detail with reference to exemplary embodiments which are illustrated in the drawings where.

DESCRIPTION OF THE PREFERRED EMBODIMENTS

Figure 1:
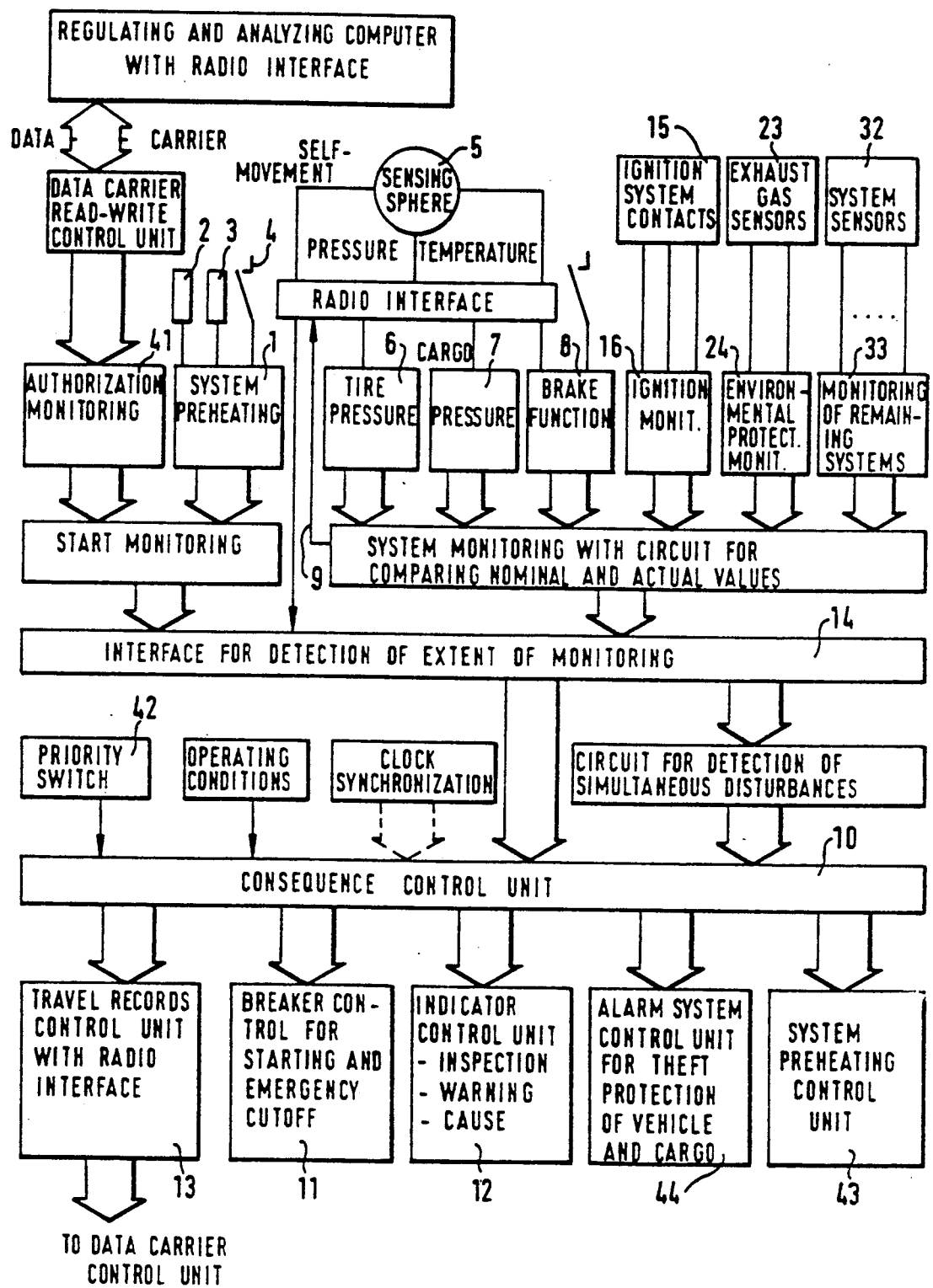
FIG. 1 is a block diagram of the new device.
Figure 3:
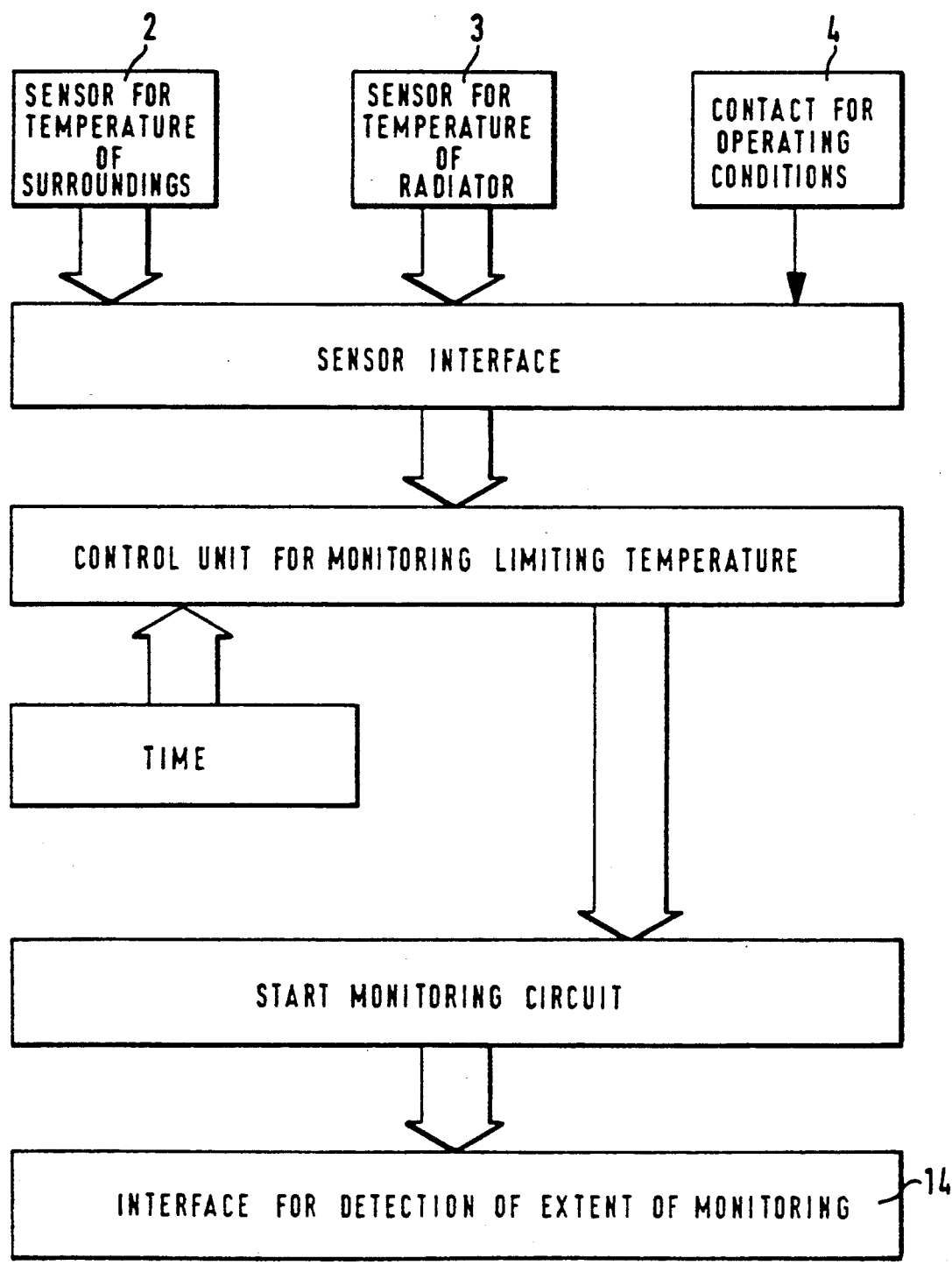
FIG. 3 shows another portion for monitoring system preheating.
Figure 4:
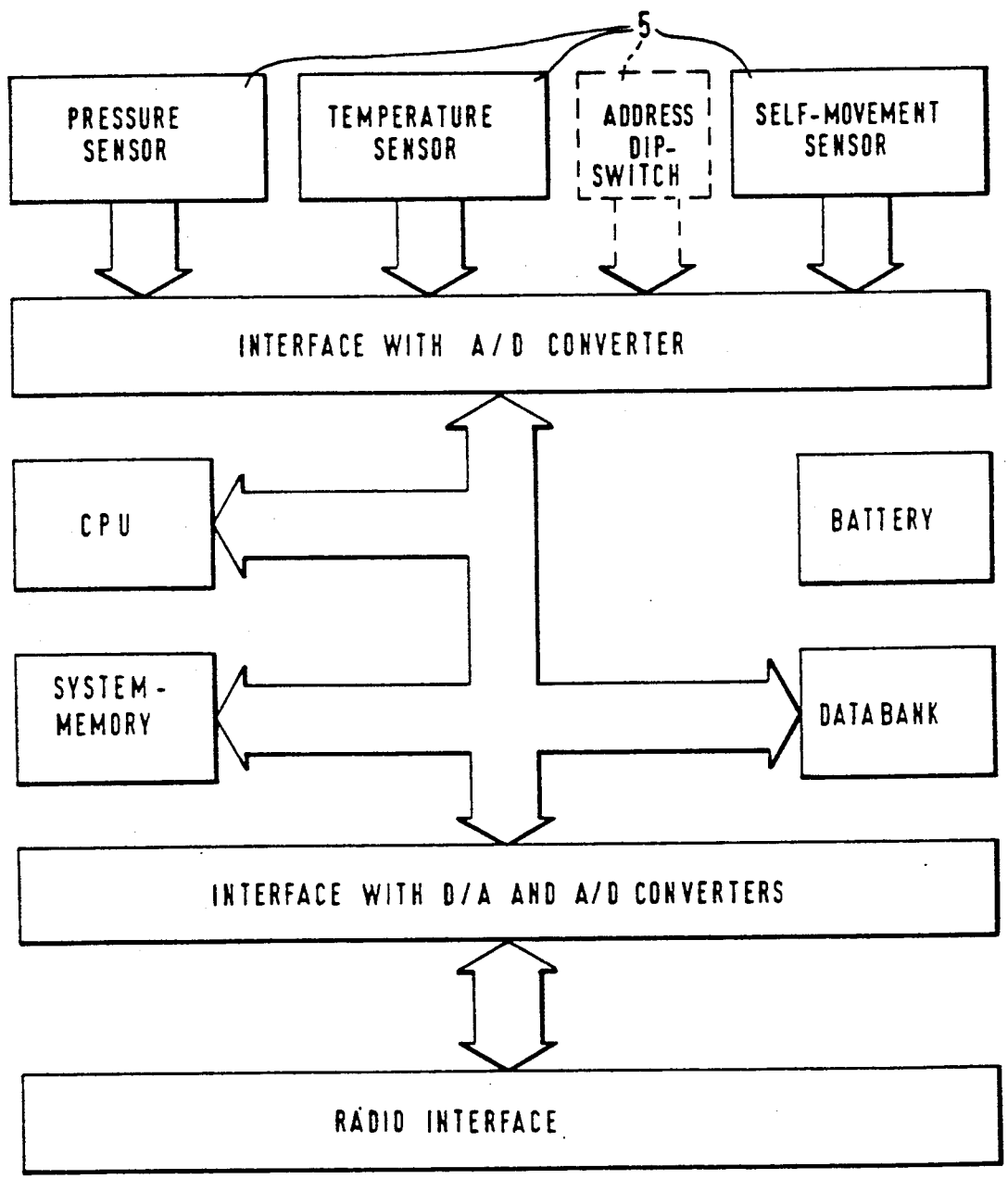
FIG. 4 shows the circuit of a spherical sensor for the tires.

FIG. 1 shows a block diagram of a preferred embodiment of the device according to the invention for protecting the systems and cargo of motor vehicles. A system preheater 1 and 43, which is illustrated in greater detail in FIG. 3, is provided for the protective operation—especially in the cold season—of the systems of motor vehicles, particularly the transmission/engine; two sensors 2 and 3 determine the temperature of the surroundings.

Figure 18:
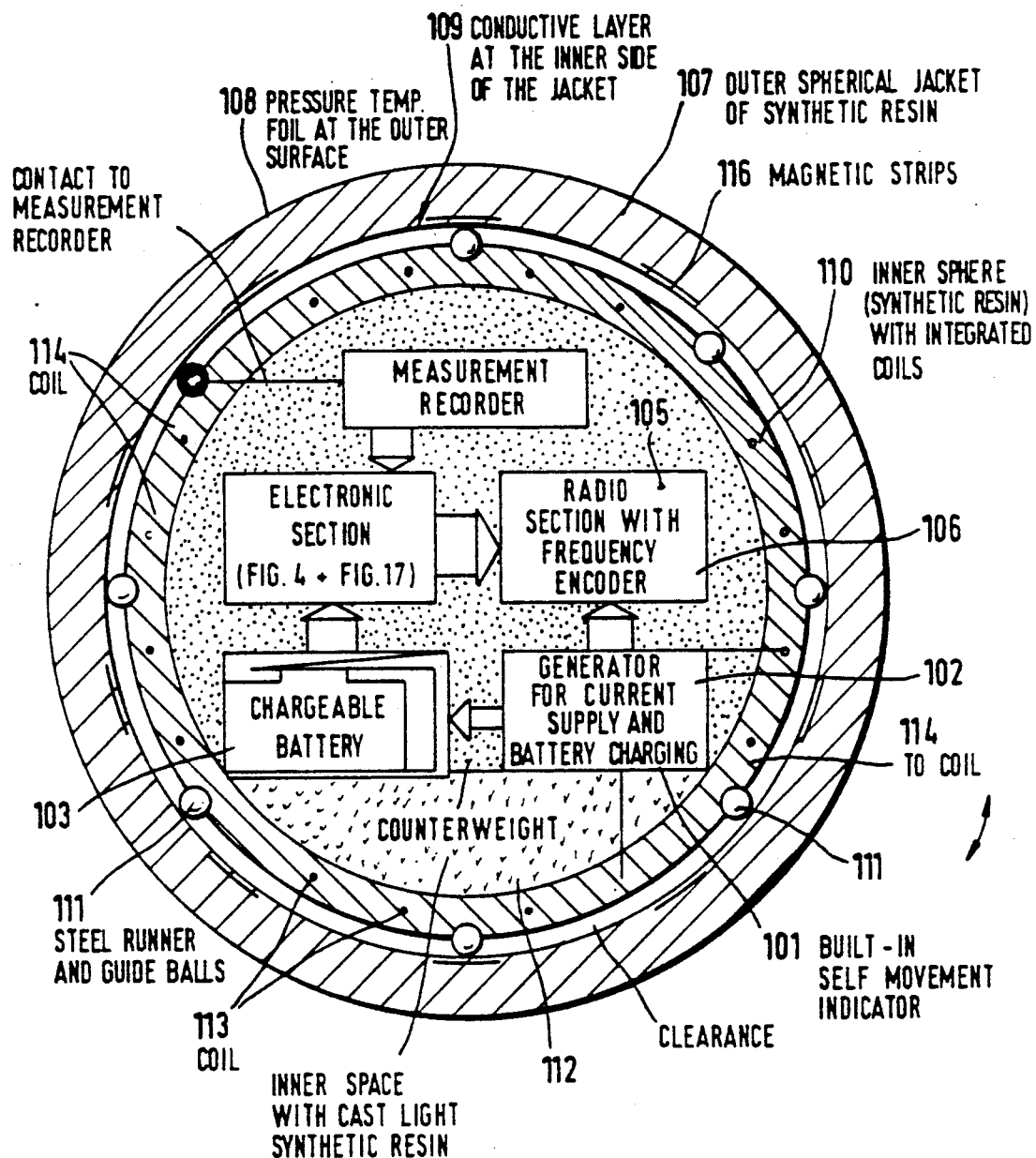
FIG. 18 shows the spherical sensor in detail.
Figure 19:
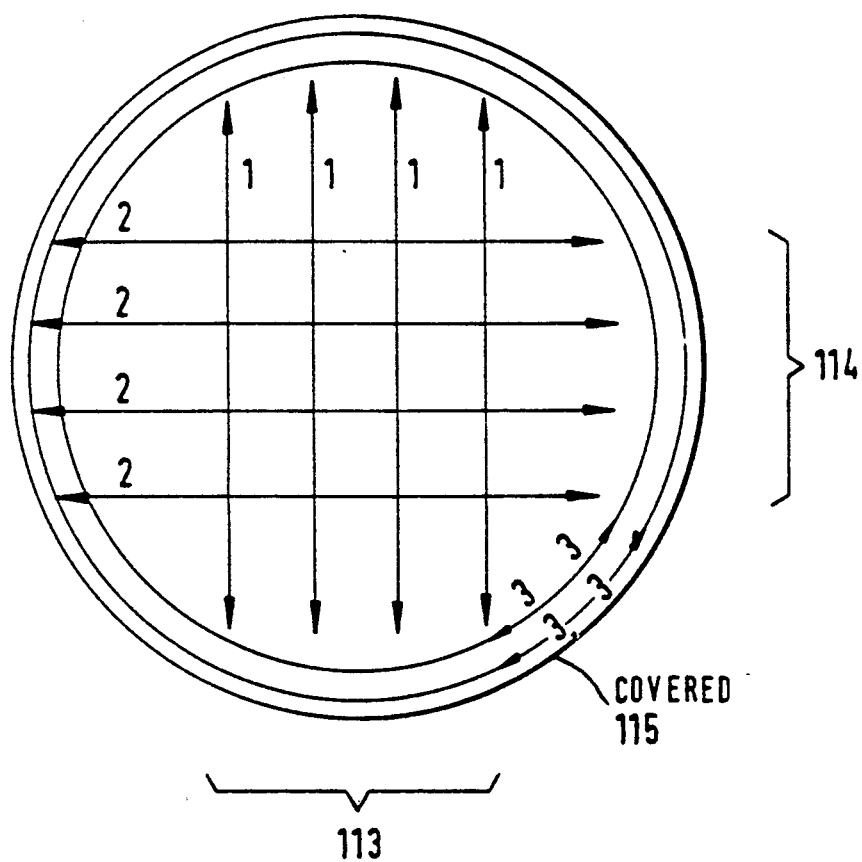
FIG. 19 shows the arrangement of the coils in the spherical sensor.

FIG. 18 shows the spherical sensor 5 in detail. FIG. 19 illustrates the basic arrangement of the coils 1, 2 and 3 according to FIG. 18.

The spherical sensor 5 has an outer jacket 107 consisting of synthetic resin, for example. A pressure-temperature measuring foil 108 is applied to the outer surface. The inner side of the outer jacket 107 is provided with an electrically conductive layer 109 which is in contact with the pressure-temperature measuring foil 108. The inner sphere 110 is rotatably mounted in the outer jacket 107 via rollers 111. An inner sphere 110 has a counterweight 112 so that the inner sphere is always vertically oriented even when the outer jacket 107 moves. The coils 113, 114 and 115, as well as the magnetic strips 116, function to detect and transmit the measured values. The arrangement of the various coils is schematically illustrated in FIG. 19.

Figure 17:
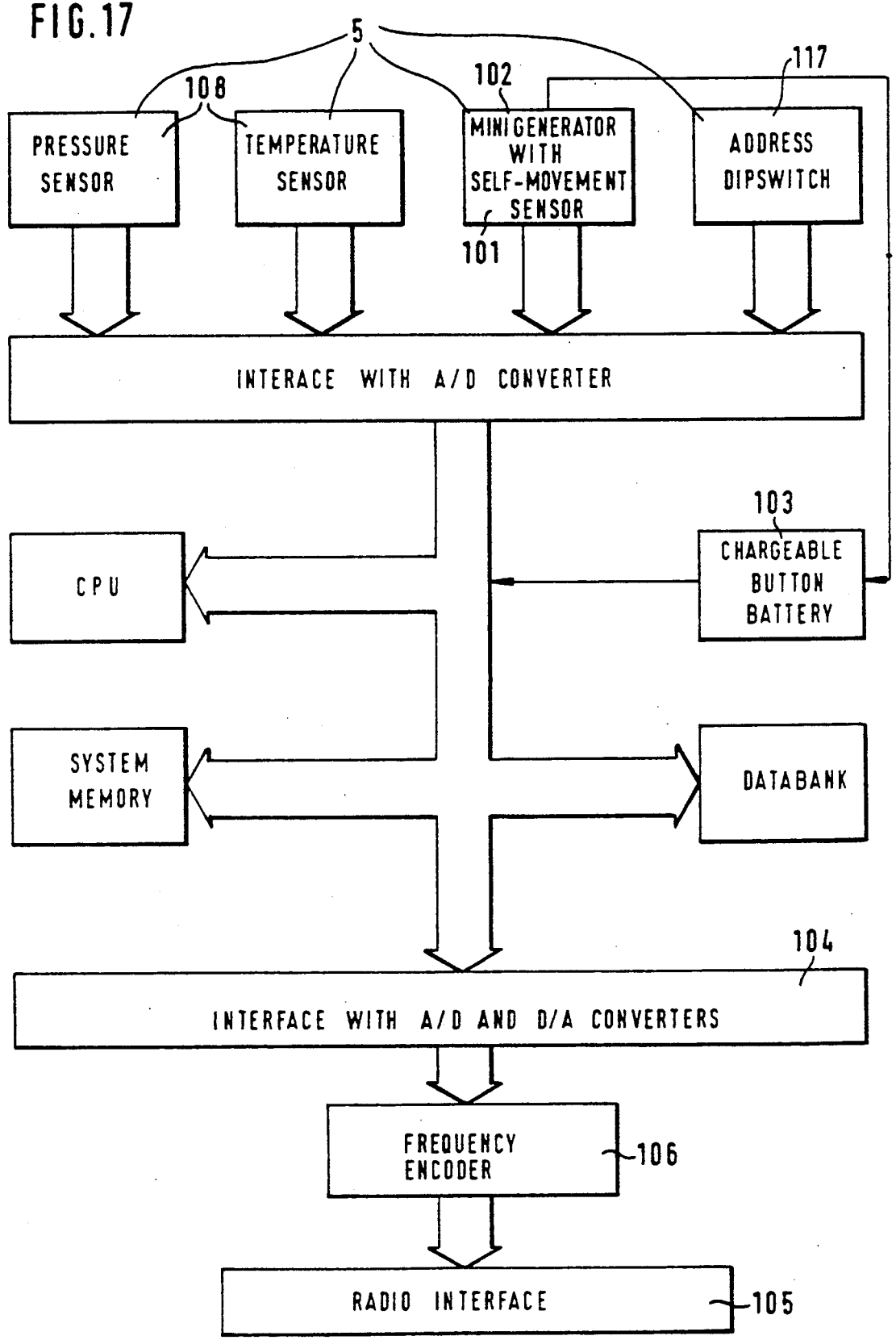
FIG. 17 is a variant of FIG. 4.

The address dipswitch 117 (FIG. 17) is provided to indicate the individual measuring locations, that is, the tire in which the sphere 5 is located, e.g., front left, rear right, etc.

Figure 5:
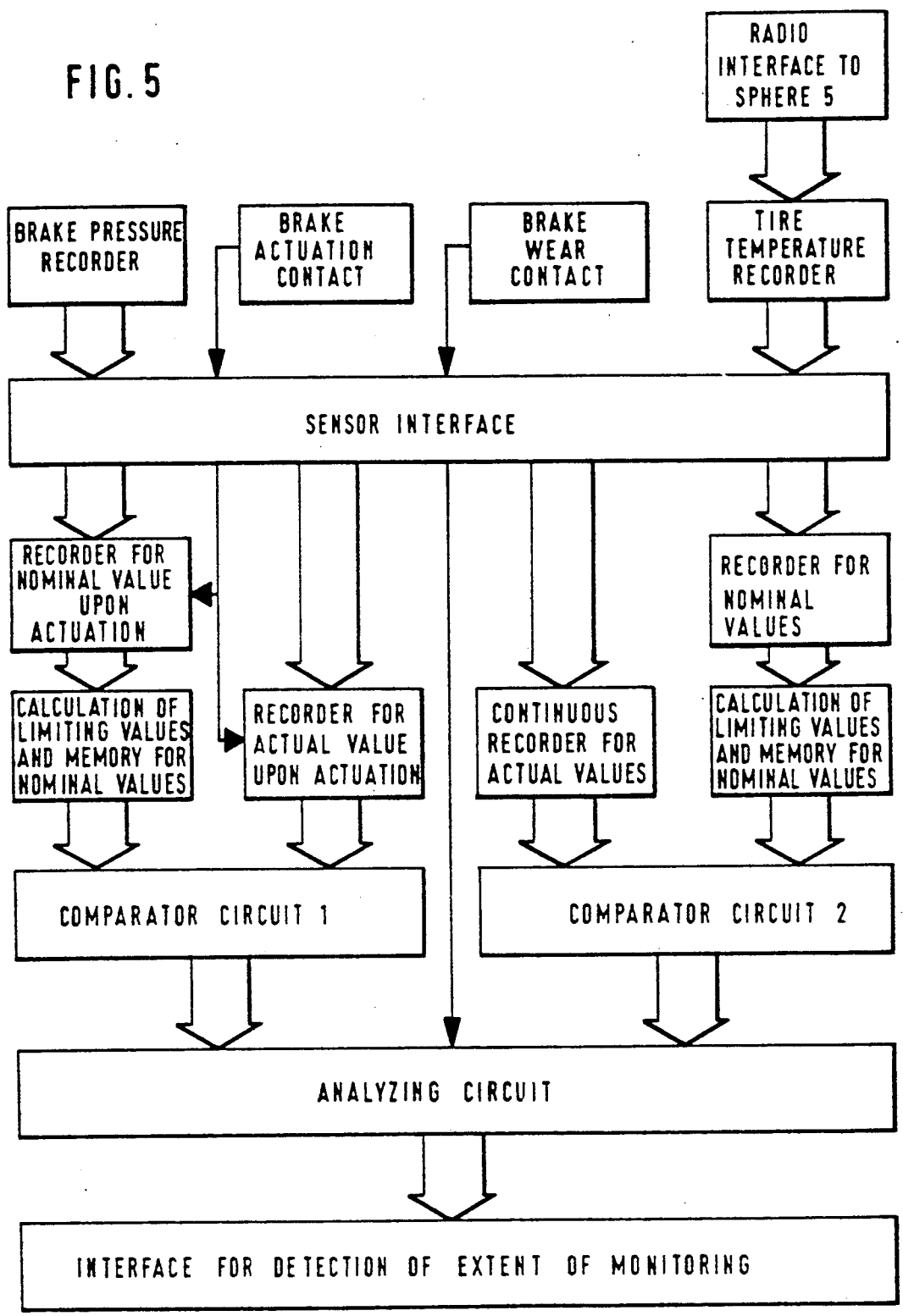
FIG. 5 shows a monitoring circuit for brake function.

The brake function monitor 8 (FIG. 1) is shown in detail in FIG. 5. A greatly required piece of information is the temperature of the tire reported by the spherical sensor 5 which, among other things, is influenced by the braking system; for instance, the tire temperature increases when the brakes are not fully released or are completely locked. The necessary consequences can be deduced from this information as indicated in FIG. 1 by the consequence control unit 10 in combination, for example, with the means 11 and 12 and the records control unit 13.

Figure 6:
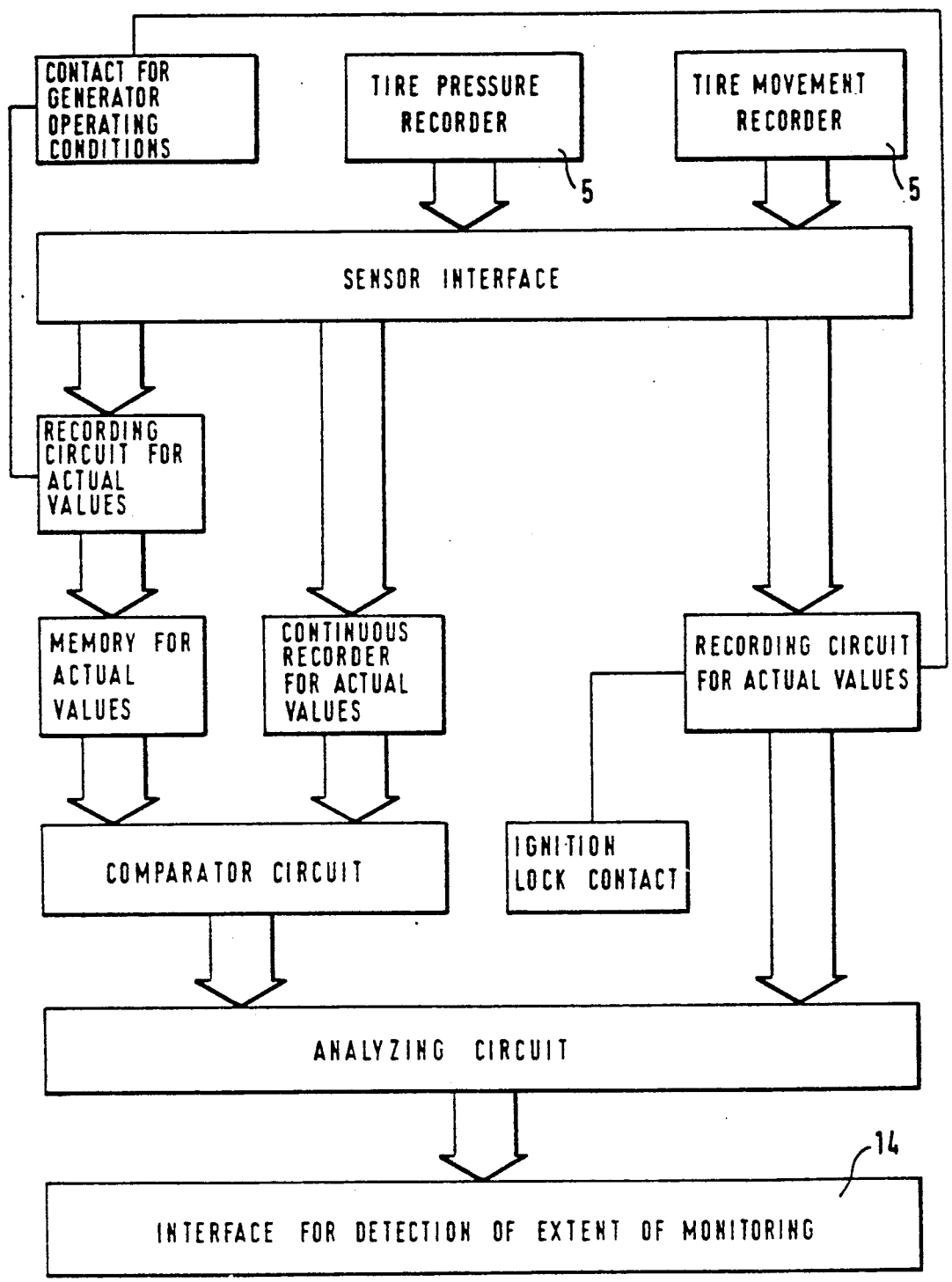
FIG. 6 shows the circuit for monitoring cargo tire pressure.

FIG. 6 illustrates in particular how the monitoring of the tire pressure and the cargo is accomplished using the information/signals "tire pressure" and "self-movement" supplied by the spherical sensor 5 located in the tires. As in FIG. 1, the two signals issuing from the spherical sensor are indicated at 5, and FIG. 6 terminates at the interface 14 for detection of the extent of monitoring (see also FIG. 1).

Figure 7:
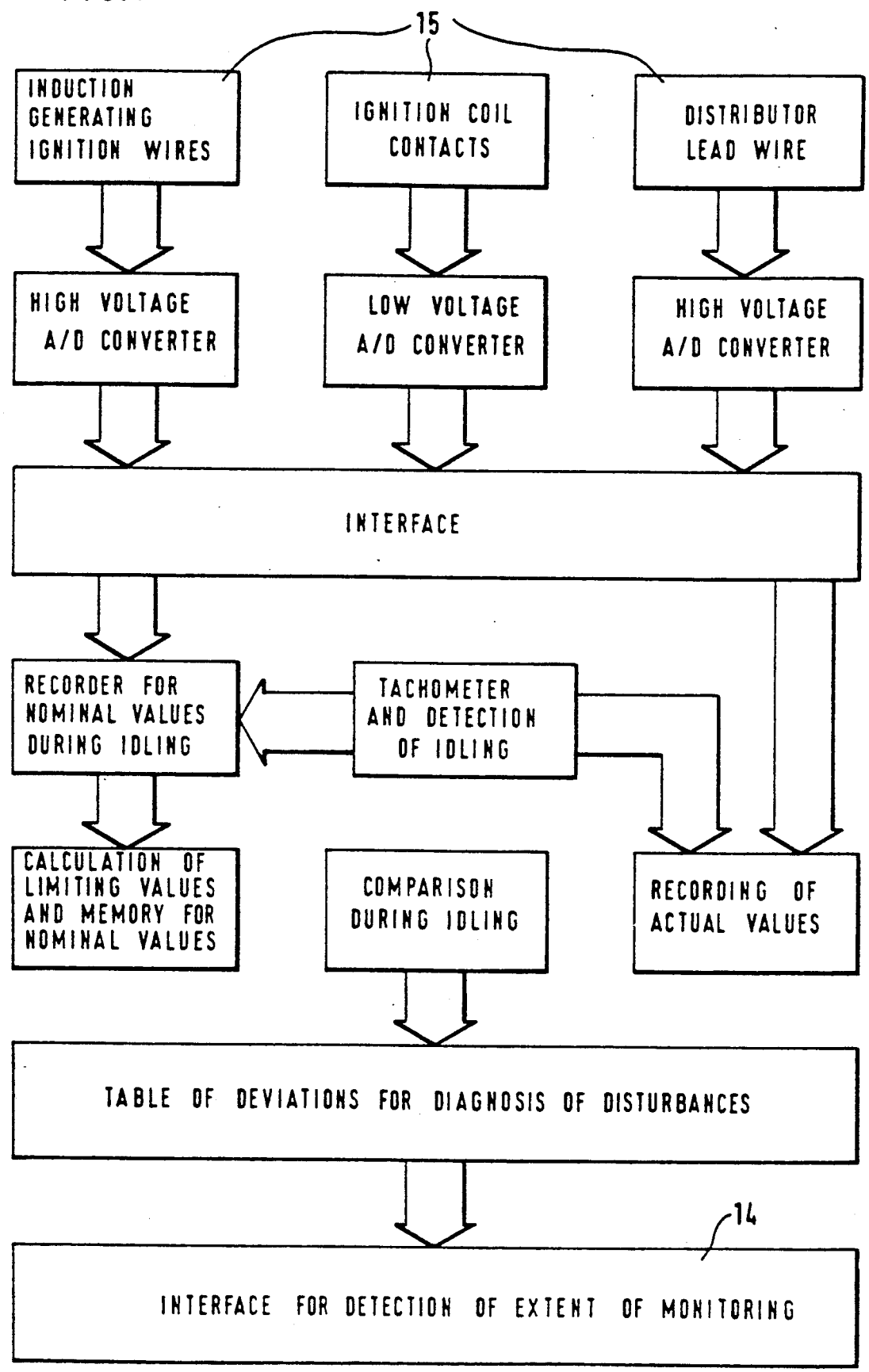
FIG. 7 shows the monitoring circuit for the ignition system and the generator.

As FIG. 1 shows at 15 and 16, the ignition system and the generator, among others, can likewise be monitored and, if necessary, caused to perform the required actions in a controlled manner. FIG. 7 illustrates in particular that this can be accomplished in that the information coming from the ignition wires, the ignition coil contacts and the distributor is prepared and processed and the required consequences deduced therefrom.

Figure 8:
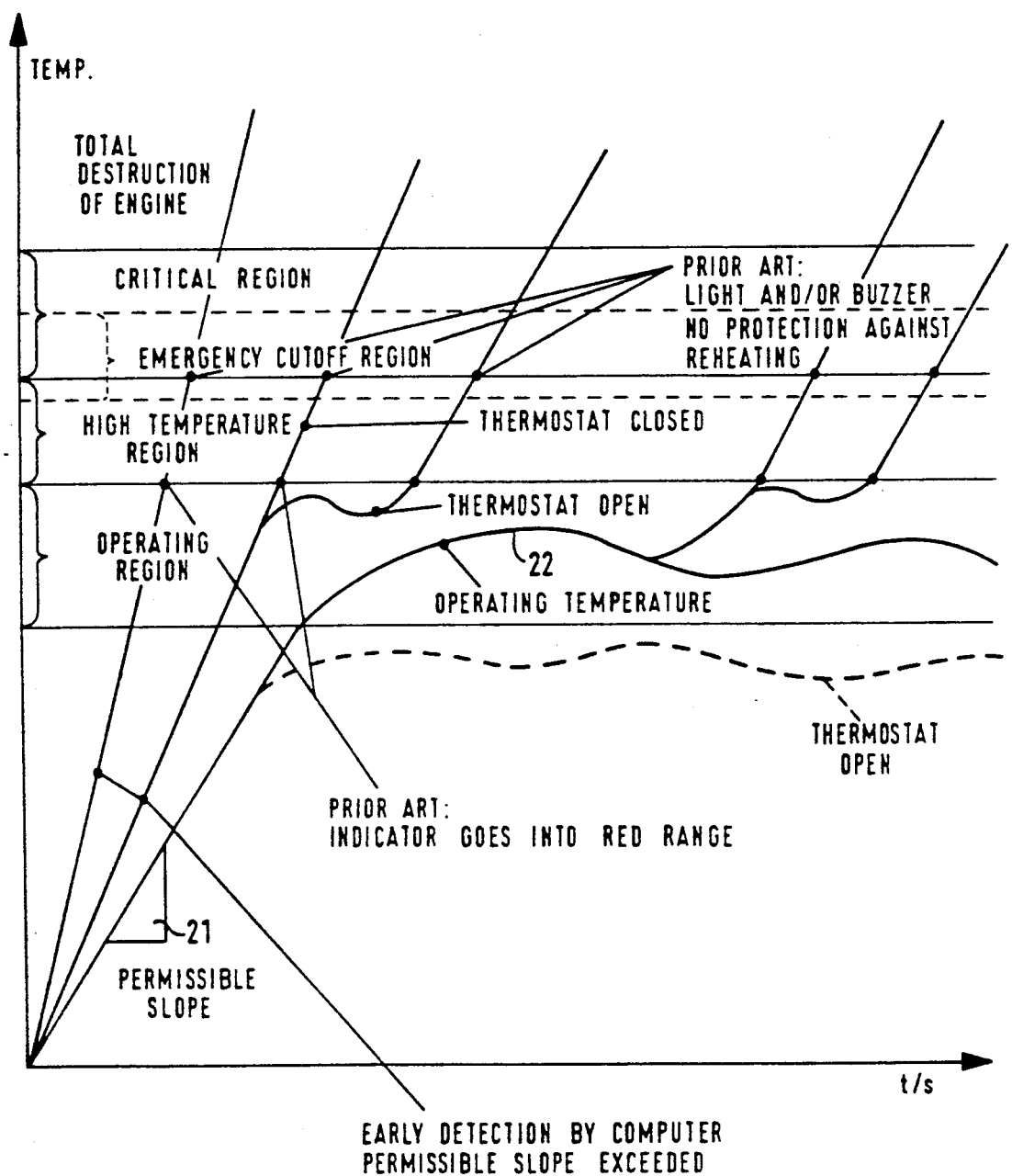
FIG. 8 shows characteristic lines for operation of an engine, FIG. 9 schematically shows the cooling circuit for an engine.
Figure 9:
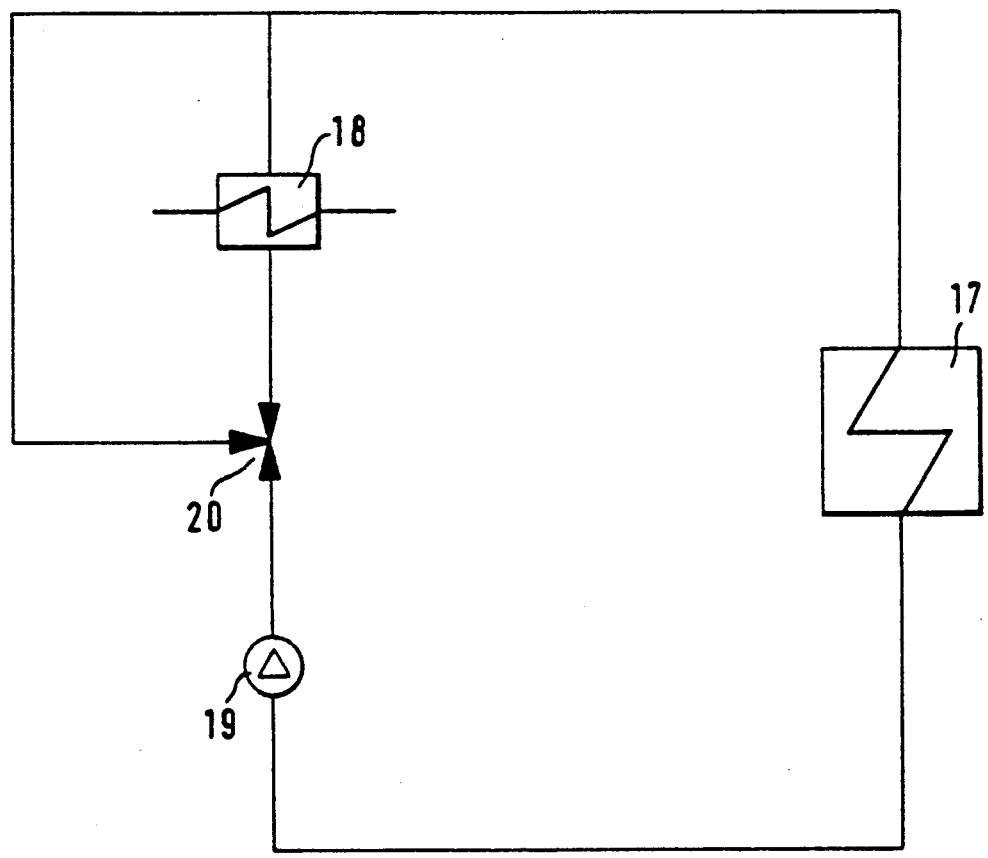

FIGS. 8 and 9 demonstrate, using the cooling circuit by way of example, how the controlled influencing of the mode of operation in accordance with the invention takes place. In FIG. 9, the engine is indicated at 17, the radiator at 18 and the water pump at 19. A thermostat is shown at 20. According to FIG. 8, a permissible slope 21 is assumed. In the prior art, nothing happens unless the indicator for the temperature of the cooling water, for example, goes into the (red) danger zone. Either a warning light or a buzzer is activated and it is left to the driver to take some kind of action. With the invention, by contrast, an emergency cutoff, for instance, is effected in a controlled manner when an undesired change from the normal operating temperature (thick solid curve 22) occurs. The device according to the invention also permits early detection when—for whatever reason—the temperature already moves into the range above the permissible slope 21 while the engine 17 is warming up.

Figure 10:
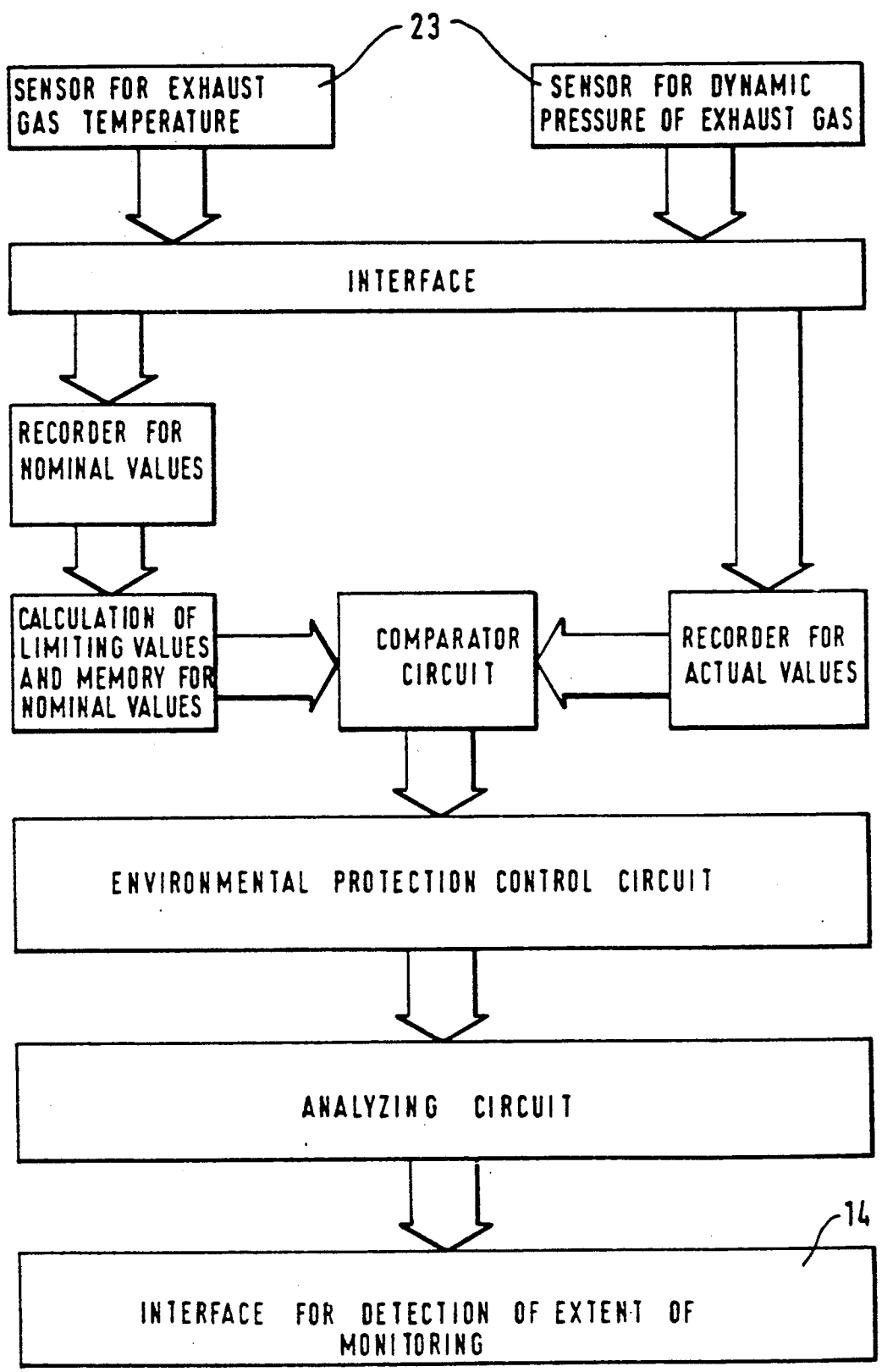
FIG. 10 shows the circuit for checking and regulating exhaust gas quality.
Figure 11:
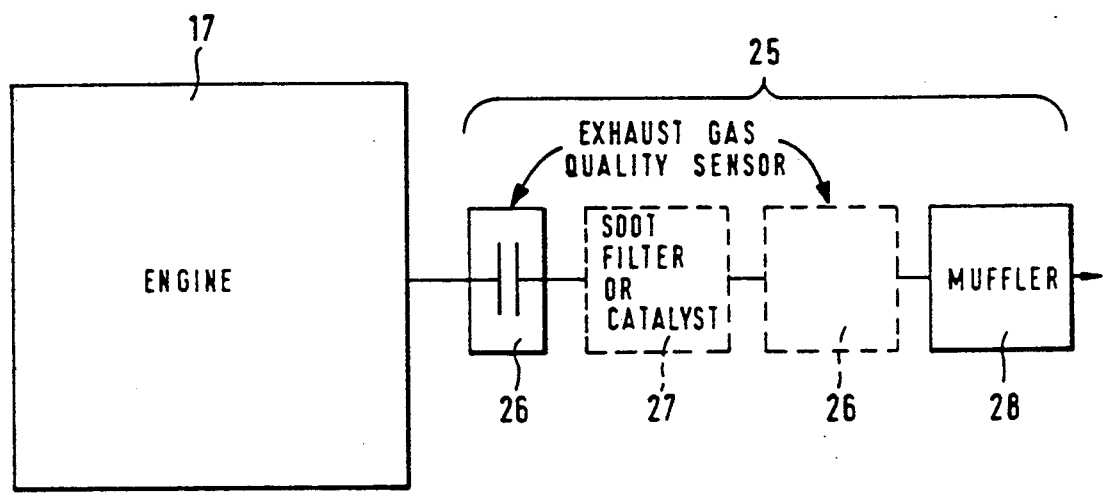
FIG. 11 shows the basic arrangement of sensors in the exhaust system.
Figure 20:
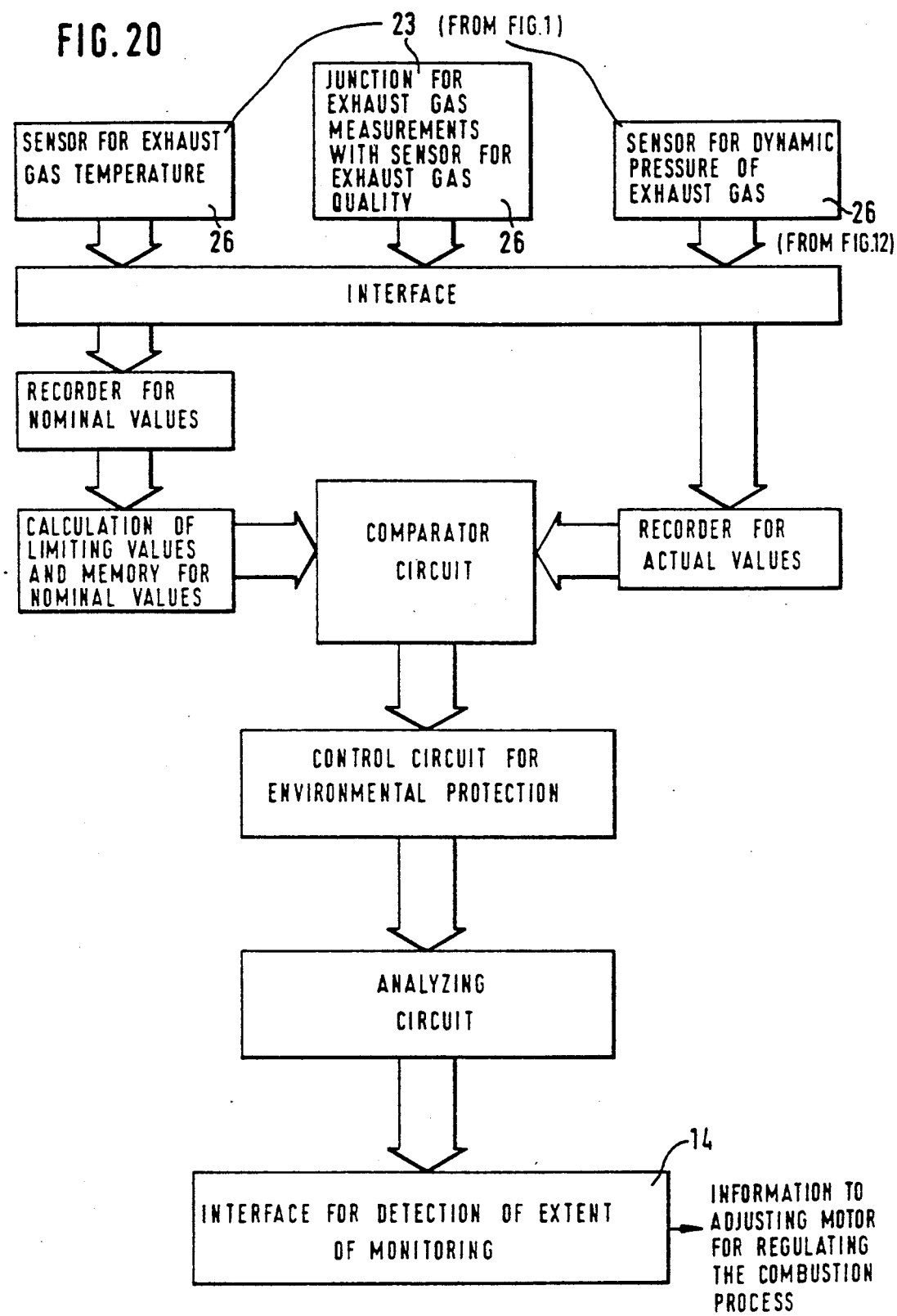
FIG. 20 shows a variant of FIG. 10

Continuous monitoring of the exhaust gas and, if necessary, regulation of the controlling units can occur by means of the system 23/24 of FIG. 1 which is illustrated in more detail in FIGS. 10 and 20. To this end, one or more sensors 26 for the quality of the exhaust gas are provided in the exhaust system 25 (FIG. 11). In the event that the engine 17 is a diesel engine, the element 27 can be a soot filter whereas the element 27 can be a catalyst when the engine 17 is a spark-ignition engine. The sensor 26 for the quality of the exhaust gas can be disposed upstream of the muffler 28 either immediately downstream of the engine 17 or downstream of the soot filter or catalyst 27.

Figure 12:
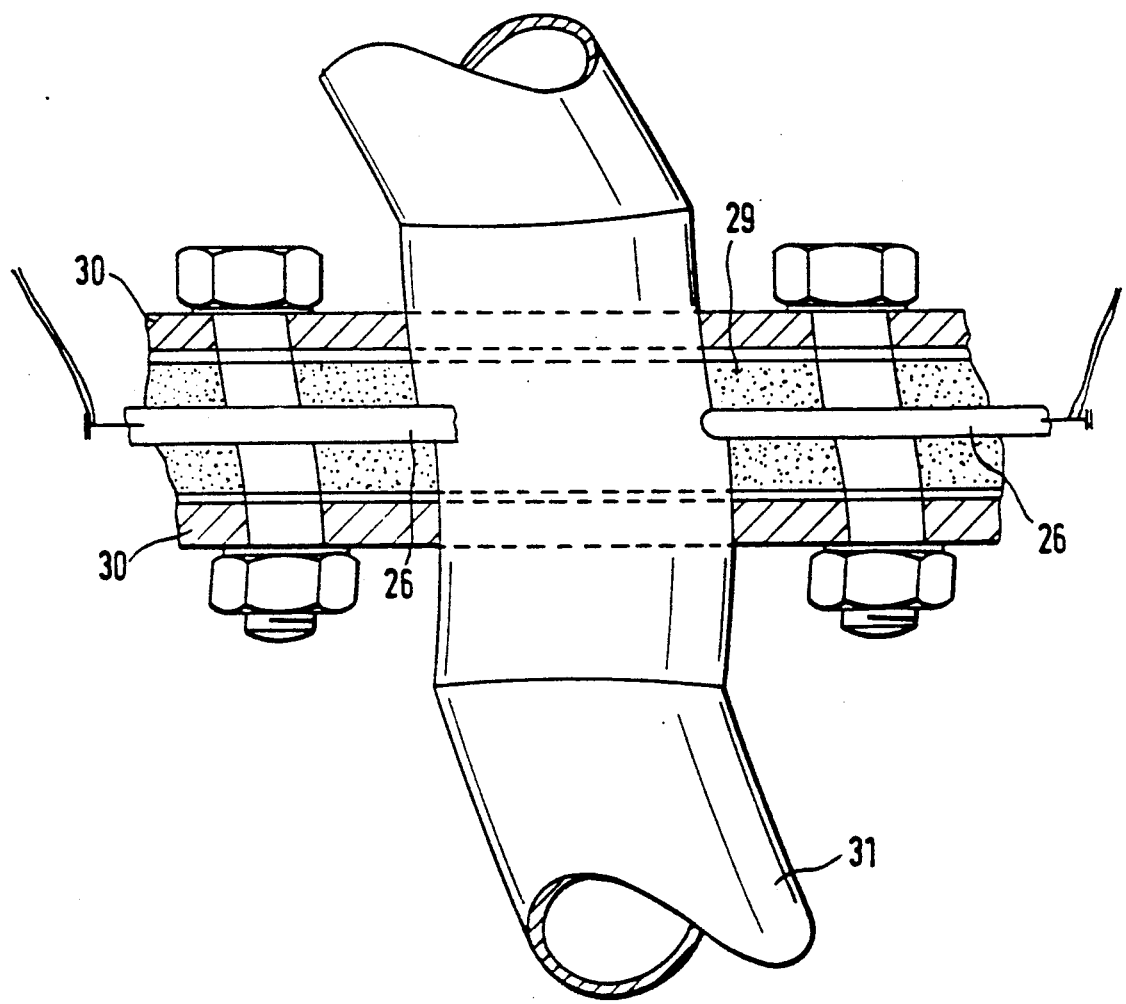
FIG. 12 shows a particular arrangement of the sensors for determining exhaust gas quality.
Figure 21:
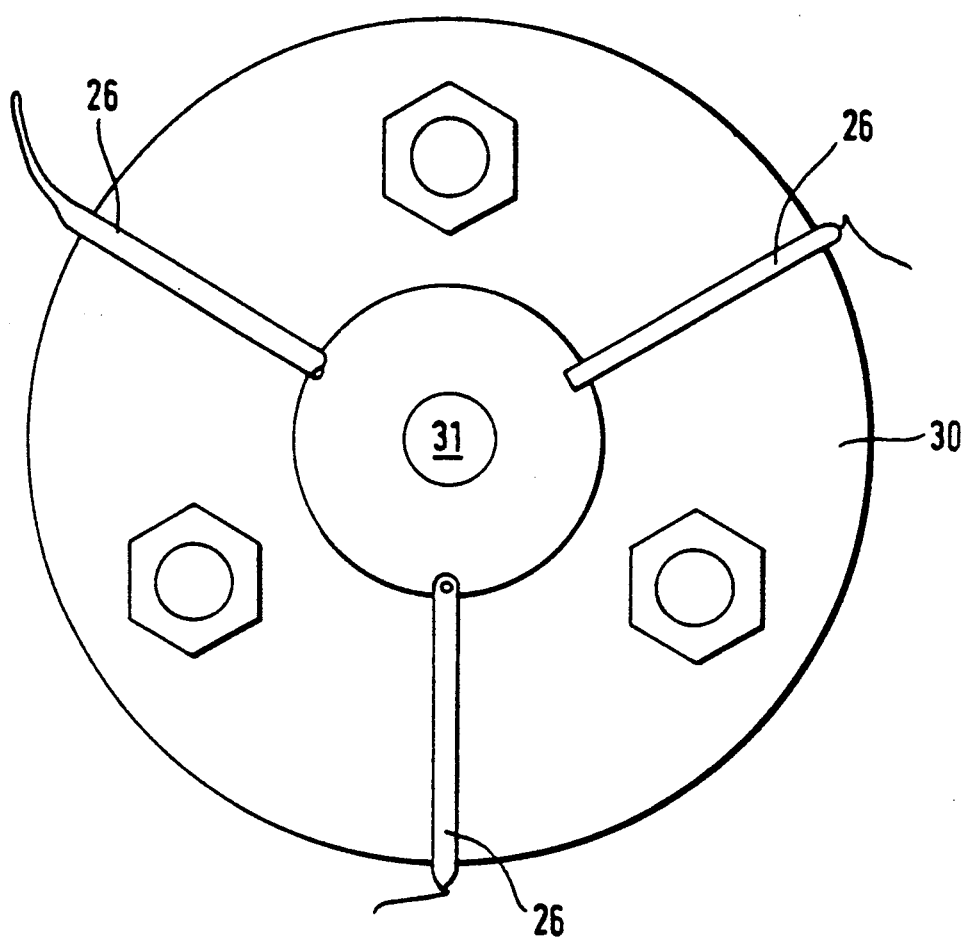
FIG. 21 shows a plan view of FIG. 12.

The sensors 26 for the exhaust gas quality can be particularly advantageously located within a seal 29 in flanges 30 of the exhaust system 25 (FIG. 12 and the associated plan view of FIG. 21). In this manner, the sensors 26 are housed so that they undergo little vibration and they are situated at locations (flanges 30) where the exhaust pipe is divided in any case, i.e., no additional bores are required in the exhaust pipe 31 in order to accommodate the sensors 26.

Figure 13:
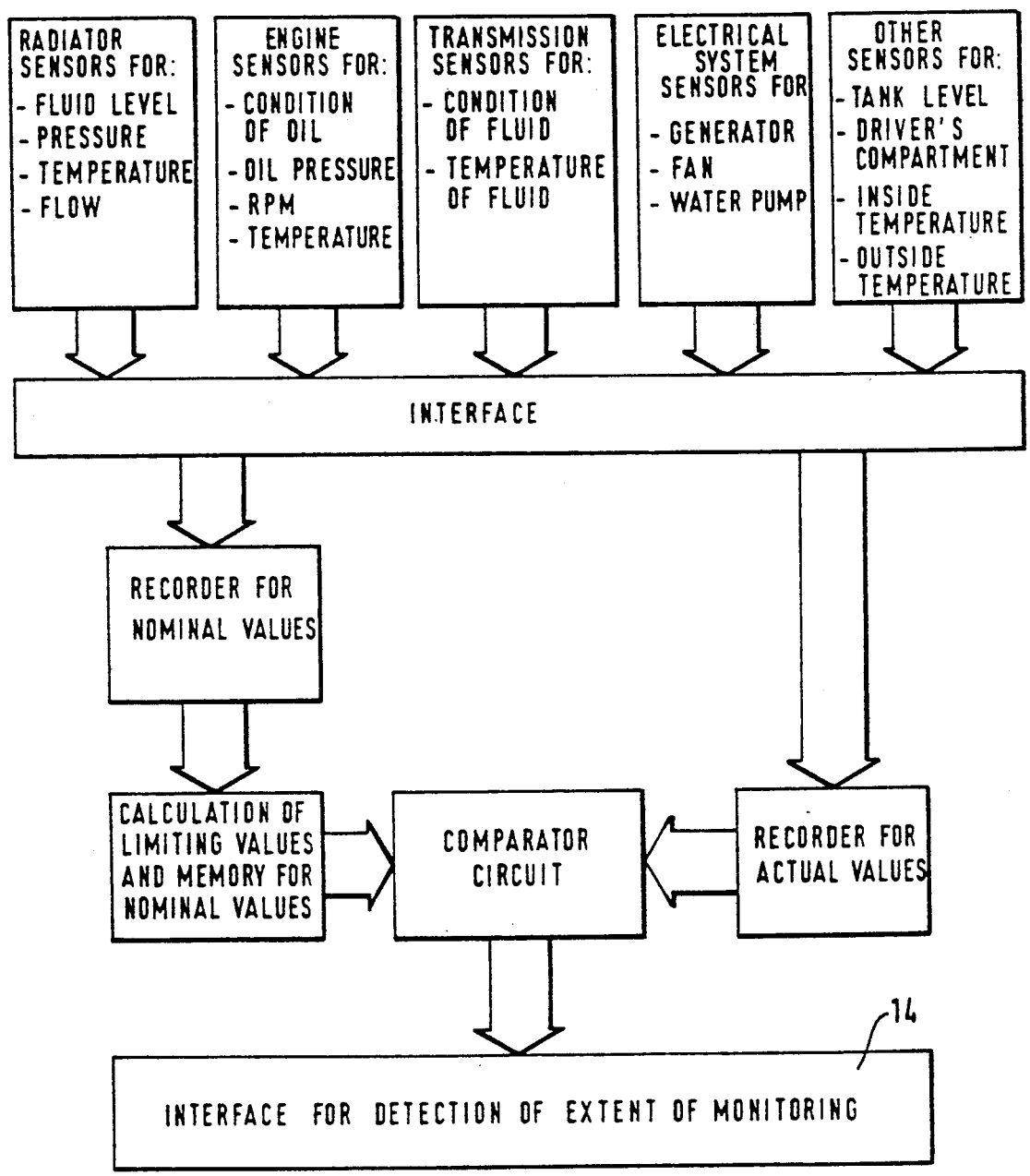
FIG. 13 shows various possibilities for the monitoring of systems in a motor vehicle, FIG. 14 schematically shows the cooling system for an engine.

As indicated at 32 and 33 in FIG. 1, various systems can be monitored in accordance with the invention. FIG. 13 illustrates by way of example that the cooling system, the engine, the transmission, the electrical system and other systems can be monitored and—if necessary—the appropriate control unit activated.

Figure 14:
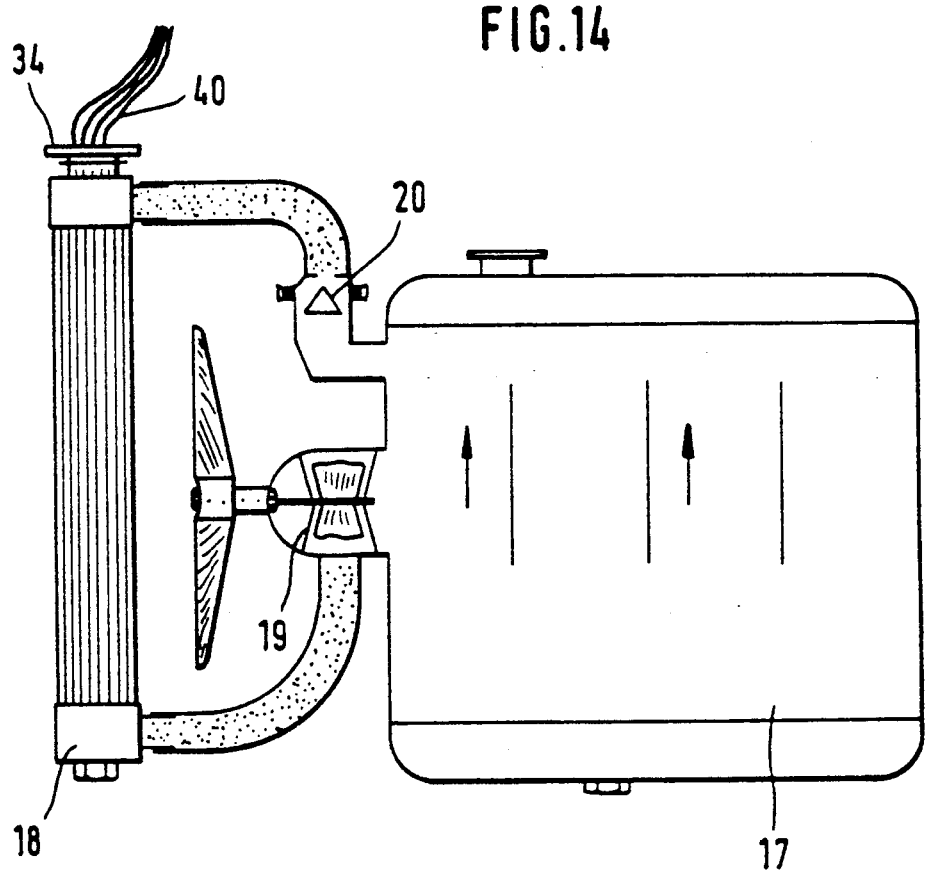
Figure 15:
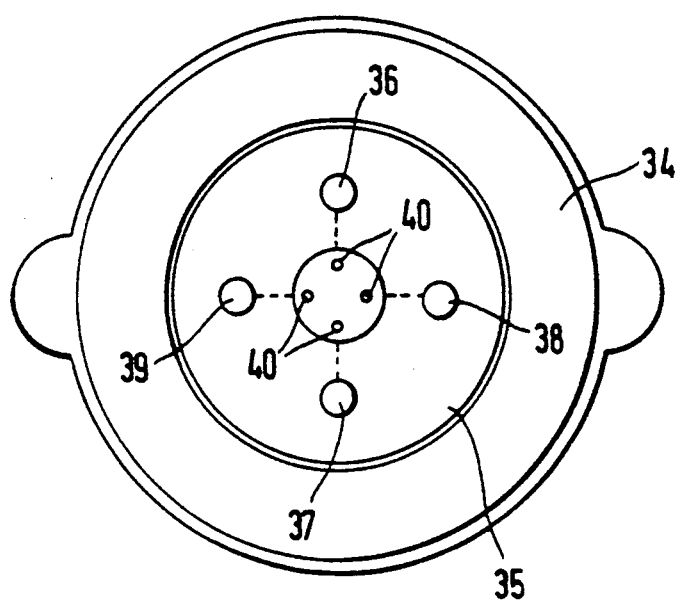
FIG. 15 shows a radiator cap with an insert.

FIG. 13 indicates, among other things, that sensors for the fluid level, the temperature and— of particular importance—the flow as well as the pressure can be provided for the cooling system. FIG. 14 schematically shows an engine 17 with a radiator 18, water pump 19 and thermostat 20. The radiator cap 34 has an insert 35 (FIG. 15) which carries the required sensors 36, 37, and 38 for the condition of the water, the pressure and the temperature. Obviously, the flow sensor (not illustrated) can also be situated in the insert 35. The insert 35 further has a relief valve 39, for example, and an exit for the conductors 40 of the individual sensors. This insert 35 according to the invention is usable for all types of caps so that it is not necessary to equip each type of cap with the sensors and the associated connections. It is possible, of course, to incorporate the sensors (36, 37, 38) directly in the cap 34 without the insert 35.

Figure 16:
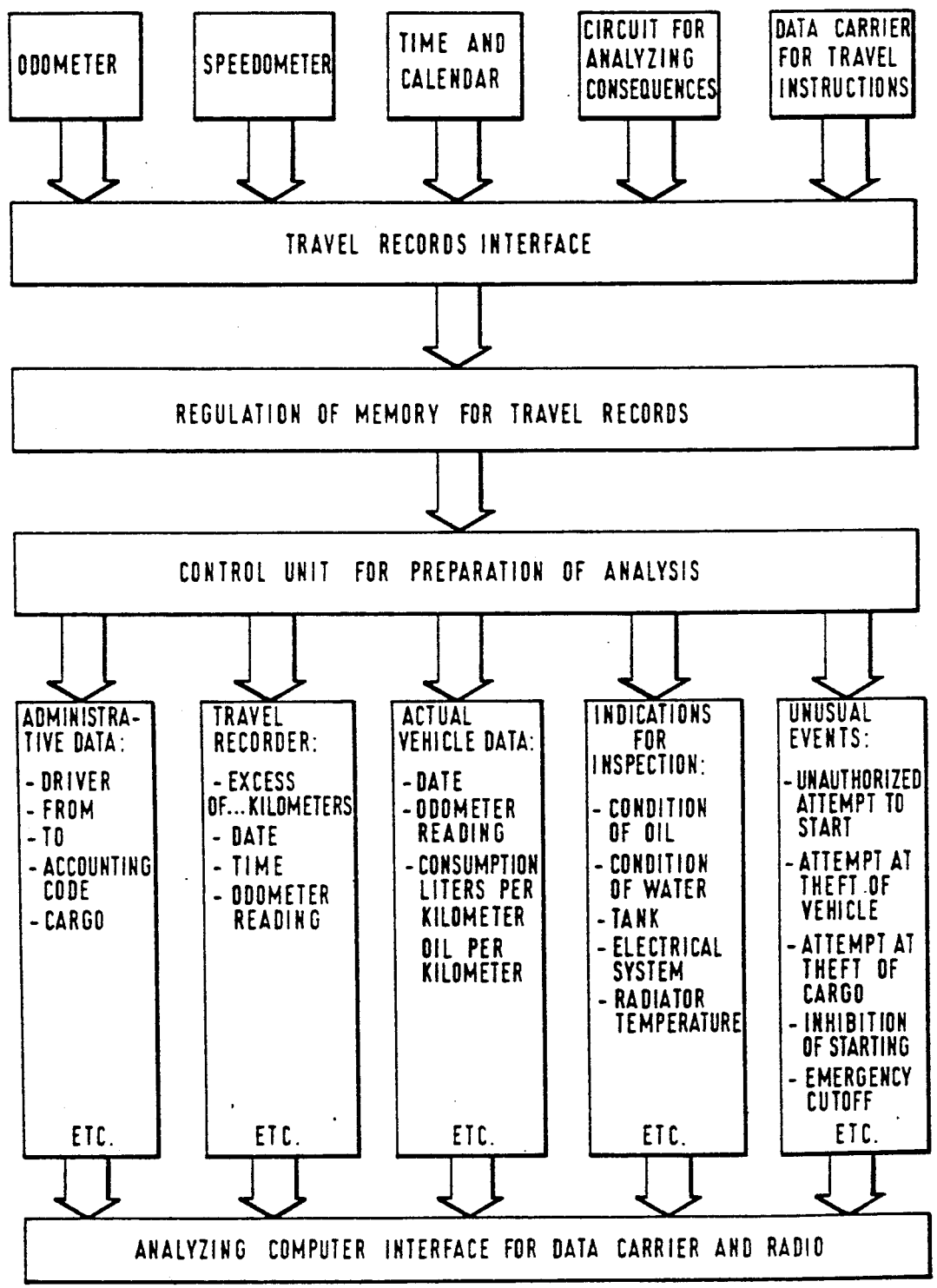
FIG. 16 shows the possibilities for records regulation with consequential analysis.

FIG. 1 shows that the consequence control unit 10 can activate a variety of means including, among others, the records control unit 13 with the radio interface, i.e., a determination as to whether problems exist for one or the other motor vehicle can be made at any time in a central operational line for the motor vehicles in a vehicle depot. FIG. 16 illustrates everything that can be indicated, registered and performed with the records control unit 13.

Figure 2:
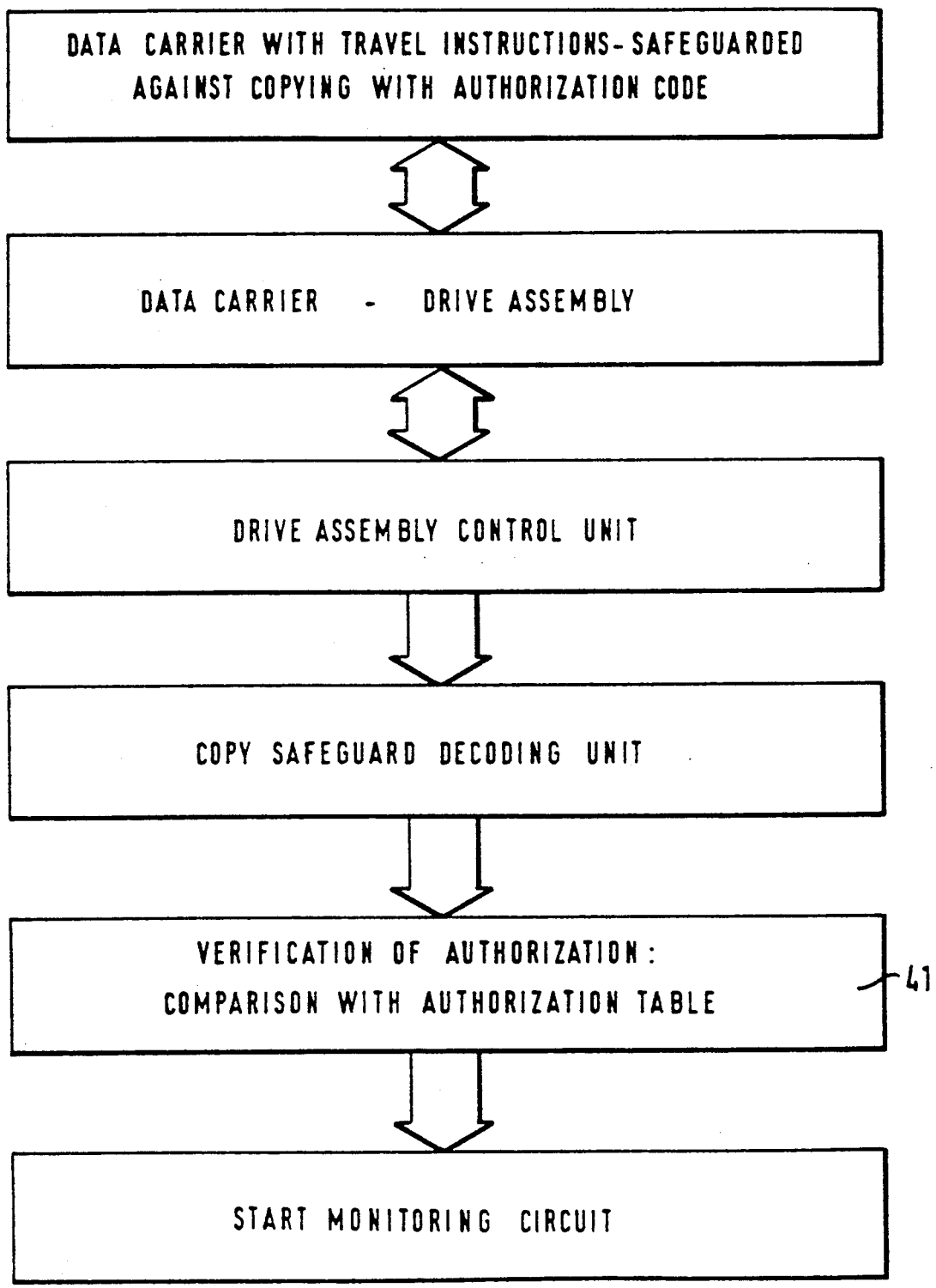
FIG. 2 shows a portion of the monitoring and control circuit which functions as an authorization monitor.

As has been described, the spherical sensor 5, which is loosely accommodated in the tires, is particularly suitable for protecting the motor vehicle and the cargo against theft. An authorization monitor 41, which is shown in detail in FIG. 2, is further provided in FIG. 1 as is an alarm system control unit 44. In this manner, double protection against theft exists.

The priority switch 42 in FIG. 1 makes it possible for the driver to bring the motor vehicle out of the stream of traffic to the side of the road in the event of an emergency cutoff, for example.

I claim:

1. A monitoring system for a motor vehicle, comprising a generally spherical body insertable in a tire of the motor vehicle, said body having first means for sensing the pressure and temperature of the tire and second means for transmission of the sensed pressures and temperatures, and said body including a generally spherical hollow jacket having said first means and a generally spherical element inside said jacket having said second means.

2. A monitoring system for a motor vehicle, comprising a generally spherical body insertable in a tire of the motor vehicle, said body having first means for sensing the pressure and temperature of the tire, second means for sensing movements of said body, and third means for transmission of the sensed pressures, temperatures and movements.

3. A monitoring system for a motor vehicle, comprising a generally spherical body insertable in a tire of the motor vehicle, said body having first means for sensing the pressure and temperature of the tire and second means for transmission of the sensed pressures and temperatures; and control means responsive to transmissions by said second means, said control means including a starting and cutoff unit for preventing an engine of the motor vehicle from starting, and for shutting off the engine, in response to transmissions from said second means.

4. A monitoring system for a motor vehicle, comprising a generally spherical body insertable in a tire of the motor vehicle, said body having first means for sensing the pressure and temperature of the tire and second means for transmission of the sensed pressures and temperatures; control means responsive to transmissions by said second means; and means for monitoring the weight of cargo in the motor vehicle based on the tire pressures transmitted by said second means, said weight monitoring means being operable to activate said control means when a tire pressure transmitted by said second means is outside of a predetermined range.

5. A monitoring system for a motor vehicle, comprising a generally spherical body insertable in a tire of the motor vehicle, said body having first means for sensing the pressure and temperature of the tire and second means for transmission of the sensed pressures and temperatures; control means responsive to transmissions by said second means; and means for monitoring a brake of the motor vehicle based on the tire temperatures transmitted by said second means, said brake monitoring means being operable to activate said control means when a tire temperature transmitted by said second means is outside of a predetermined range.

6. The system of claim 1, wherein said body is designed to be movable inside the tire relative to the latter.

7. The system of claim 1, wherein said element and said jacket are rotatable relative to one another.

8. The system of claim 7, further comprising a plurality of rollers between said element and said jacket, said rollers supporting said element for rotation relative to said jacket.

9. The system of claim 7, wherein said element comprises a counterweight.

10. The system of claim 7, further comprising a magnet on one of said jacket and said element and an electrical coil on the other of said jacket and said element.

11. The system of claim 10, wherein said jacket is provided with a plurality of magnets which are distributed over said jacket and said element is provided with a plurality of electrical coils arranged to interact with said magnets.

12. The system of claim 1, wherein said jacket has an external surface and said first means comprises a foil on said external surface for generating signals in response to changes in the pressure and temperature of the tire.

13. The system of claim 12, wherein said jacket has an internal surface; and further comprising an electrically conductive layer which is disposed on said internal surface and is connected to said foil.

14. The system of claim 1, wherein said second means is mounted on said element.

15. The system of claim 2, further comprising an antitheft alarm unit, said third means being operable to activate said antitheft unit upon transmission of a predetermined movement of said body.

16. The system of claim 2, wherein said third means comprises a radio transmitter.

17. The system of claim 2 wherein said first means is designed to generate signals in response to changes in the pressure and temperature of the tire and said body is provided with electronic processing means for the signals.

18. The system of claim 2, further comprising control means responsive to transmissions by said third means.

19. The system of claim 18, wherein said control means comprises a record keeping unit for recording data relating to the motor vehicle in response to transmissions from said third means.

20. The system of claim 18, wherein said control means comprises an indicating unit for providing indications relating to operation of the motor vehicle in response to transmissions from said third means.

21. The system of claim 18, wherein said control means comprises an antitheft alarm unit responsive to transmissions from said third means.

* * * * *